Aug. 16, 1949.	L. OCHTMAN	2,479,019
ACTUATOR NUT
Filed Dec. 3, 1947	2 Sheets-Sheet 1
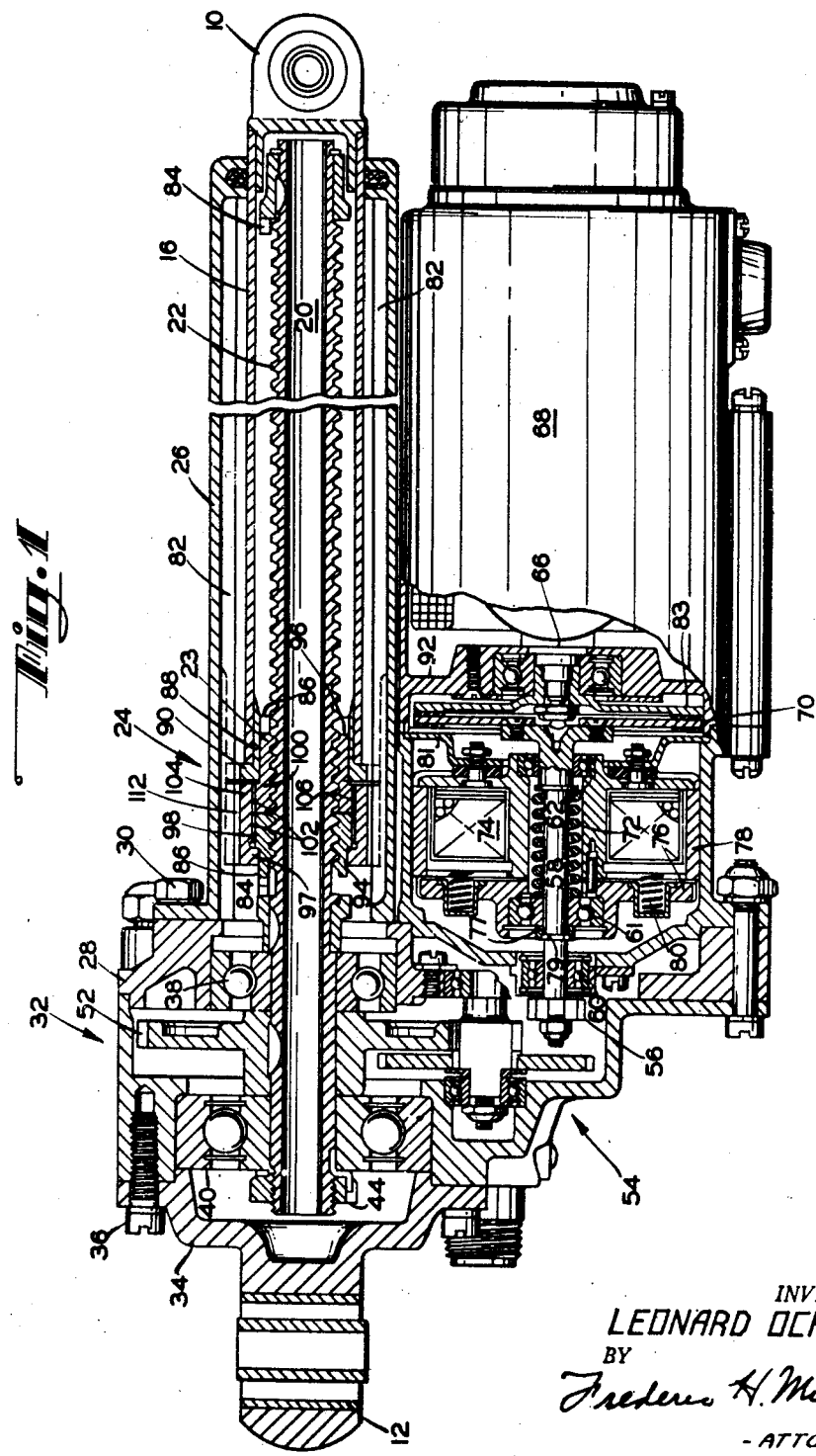
INVENTOR.
LEONARD OCHTMAN
BY
Frederic H. Miller
-ATTORNEY-

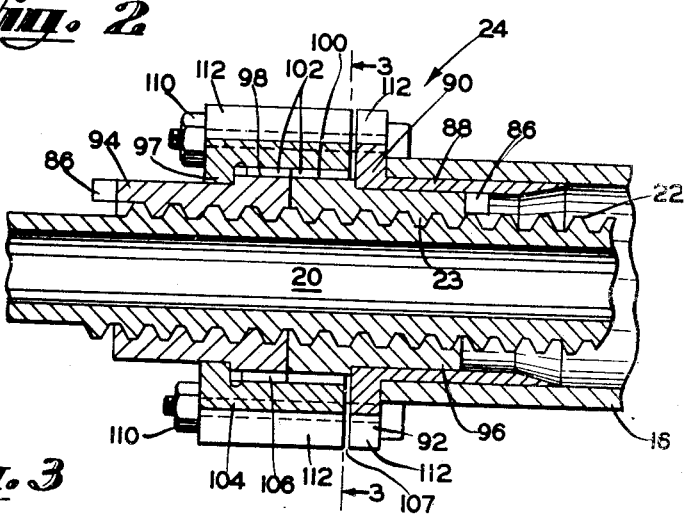
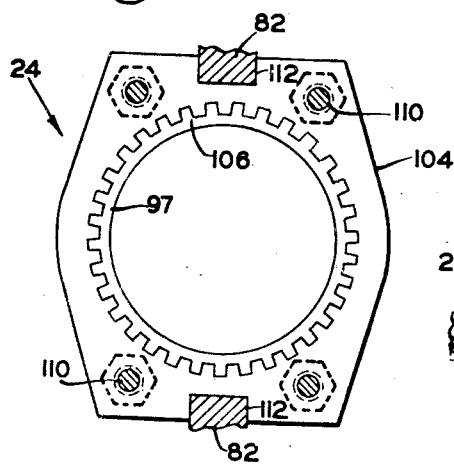
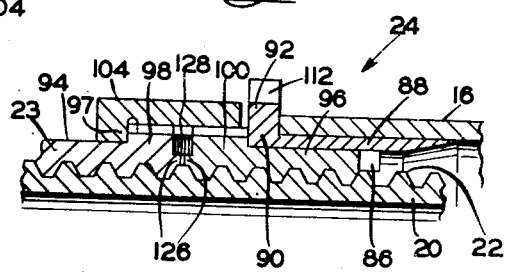
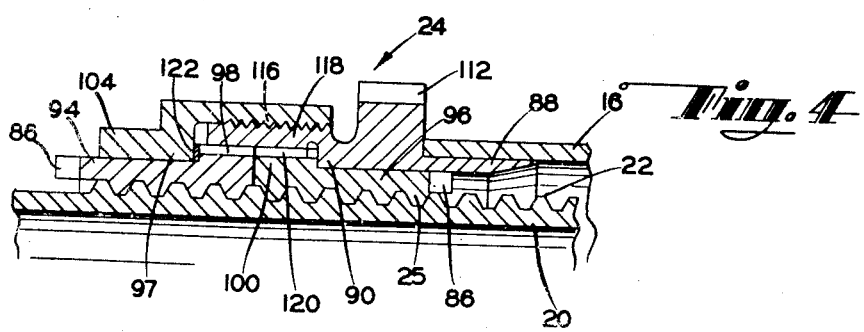

Patented Aug. 16, 1949

2,479,019

UNITED STATES PATENT OFFICE 2,479,019

ACTUATOR NUT

Leonard Ochtman, Ridgewood, N. J., assignor to Bendix Aviation Corporation, Teterboro, N. J., a corporation of Delaware Application December 3, 1947, Serial No. 789,391

10 Claims. (Cl. 74—424.8)

This invention relates to actuators, and particularly to a nut structure adapted for cooperation with an actuator screw shaft.

The actuator given herein as an example of an effective application of the nut, is constituted substantially as a longitudinally extensible link including axially relatively movable housing and reach portions having outer end terminals, respectively, at opposite ends of the link adapted for linking the actuator between relatively movable members, such as a base on a wing of an airplane on the one hand, and a tab or flap on the other hand, the actuator, of course having many other applications.

A shaft within the link has an operating portion in the housing and a screw shaft portion extending along the reach portion, the latter of which may be in the form of an arm of any desired kind, but which, since it is normally a tube enclosing the screw shaft, will hereinafter be referred to as a tube.

The shaft, in this instance, is driven by an electric motor associated with the housing, through gear reduction means including an output pinion cooperating with a gear wheel on the operating portion of the shaft in the housing.

The tube, which in its entirety may be considered as a nut, has actually, in this example, only a short portion of its length of nut form, the latter, in the shortest condition of the link, lying adjacent to the housing, and, in the longest condition of the link, lying near the outer end of the screw shaft.

During operation of the device, the nut travels back and forth along the shaft, and for accuracy or precision operation of the flap, tab or other member being operated, all appreciable back lash between the nut and the shaft should be maintained at a minimum consistent with effective operation. Ordinarily, as where the nut is of one piece, such effective operation cannot be maintained with much repeated operation, which causes wear and increasing back lash between the nut and screw.

Among the objects of the invention are to overcome the disadvantages of a one-piece nut, to provide a more effective compound nut and to accomplish these results by novel effective means.

Another object is to provide a nut structure adapted to effect finer adjustments compensating for wear between the nut and the screw without resorting to the use of shims, but which, in one form, provides for the addition of shims, as will further appear.

Another object is to associate the novel nut structure, in certain cases, with jaws at its ends for cooperation with stop jaws at the ends of the extreme limit of the nut travel, without adversely affecting the nut adjustment.

Another object is to provide a nut structure which is adjustable to any desired running tolerance relative to a screw, without requiring the threads to be held to usual close tolerances.

Another object of the invention is to provide a nut structure as indicated which does not depend for operation, other than its operation on the screw, with any element separate from the nut.

Another object is to provide a nut structure of the above-indicated character which is simple and durable in construction, economical to manufacture, and effective in its operation.

The above and other objects and features of the invention will appear more fully from a consideration of the following description, taken in connection with the accompanying drawings wherein three embodiments of the invention are illustrated by way of example.

In the drawings:

Figure 1 is a side view, partially in elevation and partially in section, of an actuator embodying a nut and other features of the invention, and showing certain parts positioned as they are when an electrical circuit of the actuator is de-energized;

Figure 2 is a view, on an enlarged scale, of a portion of the device, as viewed in Figure 1;

Figure 3 is a view, on a slightly further enlarged scale, taken substantially along the line 3—3 of Figure 2;

Figure 4 is a view, similar to a portion of Figure 2, of a modification of the structure thereof; and Figure 5 is a view, similar to Figure 2, of a further modification of the invention.

Referring to Figure 1, the device is substantially in the form of an elongated link having, in this instance terminal means constituted as pivot eyes 10 and 12 for attaching the link to members between which it is desired to impart motion.

The eye 10 has a shank portion longitudinally fitted into an outer end of a tube 16, which surrounds a hollow screw shaft 20 embodying threads 22 cooperating with threads 23 of a nut or nut portion 24 of the tube 16.

A tubular cover 26, shown only in Figure 1, encloses most of the tube 16 in the retracted position of the latter shown, and has a radially outward flange at its inner end secured, as by screws 30 to one end member 28 of a gear housing 32. The eye 12 constitutes part of a cover or opposite end member 34 of the gear housing 32, which cover is also secured in position, as by screws 36.

The screw shaft 20 is journaled in anti-friction bearings 38 and 40, in the gear housing 32, and held axially by means including a locked nut 44 cooperating with the inner race of the bearing 40.

A gear 52, fixed to the screw shaft 20, constitutes the output gear of a train 54 having an input pinion 56 on a driven shaft 58, which is journaled in ball bearings 60 and 61.

The shaft 58 is adapted to be driven from a shaft 66 of a motor 68 through the intermediary of a driven disc 70.

During deenergization of the motor 68 and a solenoid 74, springs 80 maintain an armature disc 76 away from a core 78 and act through the bearing 61, a sleeve 77 and a locking ring 79 to force the disc 70 into engagement with a brake 81. Under normal conditions, and with the motor and solenoid energized to locate the parts as shown, the disc 70 is withdrawn from the brake 81 and engaged to a driving disc 83 on the motor shaft 66, whereby the shaft 20 is driven through the gear train 54.

In effecting this action, the armature disc 76, which before the solenoid 74 is energized, is in its position farthest from the core 78 in its weakest flux field, is therefore initially required to overcome the weaker springs 80 to disengage the clutch disc 70 from the brake 81. During this initial action, a stronger spring 72 is unyieldingly carried along with the shaft 58, but as the clutch disc 70 separates from the brake 81 and the armature disc 76 reaches a stronger flux field, the pull of the armature by the core is translated into a push or yielding compression of the stronger spring 72 whereby the clutch disc 70 is engaged to the driving disc 83 under force stronger than the combined forces of the springs 80 and 72 produced by the armature movement.

In combination with the above-described or equivalent structure, according to the present invention, in one specific form, the cover 26 is provided with key means, such as two keys 82, Figures 1 and 3, extending along the cover therein fixed thereto. Stop jaws 84 are supported on the screw shaft 20 at the extreme limits of travel of the nut portion 24 for engagement with cooperating jaws 86 at the ends of the nut.

Referring also to Figures 2 and 3, the nut 24 includes a structure 88 fixed to the tube 16 having a shoulder 90 and a flange 92 laterally of the nut axis. The nut further comprises relatively movable axially separable nut halves or components 94 and 96, which may or may not be identical, and which embody radially outer end collars 98 and 100, respectively, adjacent to each other, and having radially outer axial splines 102 of fine pitch thereabout.

The splines 102, on the components 94 and 96, respectively, are adapted for axial register with each other at any selected of a multiplicity of positions of the components relative to each other about the nut axis, and one of which collars, namely the collar 100, is adapted to be positioned axially by or against the shoulder 90.

A short tube or ring-like structure 104 has splines 106 adapted to fit between the splines 102 of the components 94 and 96 at any of said positions, and is provided with a radial shoulder 97 cooperating with the first shoulder 90 to axially embrace the collars 98 and 100. As shown in Figures 2 and 3, bolt and nut means 110, in this example, cooperate between the ring 104 and the flange 92 to clamp the shoulders 97 and 90 oppositely, or toward each other, relative to the collars 98 and 100, with a clearance 107 between the shoulder 90 and the ring 104.

Either the structure 88, or the ring structure 104, or both, may be provided with guide slot means 112, axially slidably fitting the key means 82 to be prevented from turning thereby.

By reason of the relatively great multiplicity of fine pitch splines 102 and 106, by comparison to the diameter of the collars 98 and 100, a very slight turning of the components 94 and 96 relative to each other, for adjusting the clearances between the threads 22 of the shaft 20 and the threads 23 of the components, results in an extremely small axial movement of the components relative to each other until the splines register for the reception of the ring 104. Thus, in many cases, it is not necessary to employ the usual shims, which are ordinarily employed for such purpose.

In assembly, the components 94 and 96 are screwed onto the shaft 20, with the collars 98 and 100 facing each other. When the components are screwed tightly together, all end play on the screw is taken up, whereupon, by backing one of the components away from the other by a slight amount, as by the spacing of one spline, play is provided for running clearance. After this adjustment, the ring 104 is telescoped over the components 94 and 96 with its splines between the splines thereof, and the bolt and nut means 110 applied and tightened in position, which adjustment may be repeated to take up slack between the threads caused by wear, without resort to the employment of small shims, which are difficult to handle and may not always be available when needed.

In Figures 4 and 5, corresponding parts are designated by corresponding reference numerals.

Referring to Figure 4, the modification therein shown is similar to the nut structure of Figures 1, 2 and 3, with the exception of the omission of the bolt and nut means 110 and associated parts, the function of which means is performed in this instance, by screw threads 116 on the ring 104, in the place of the ring splines 106. The threads 116 cooperate with threads on a sleeve 118 having splines 120 taking the place of the ring splines, and constituting part of the structure 88.

A washer 122 is provided between the shoulder 97 and the collar 98 to facilitate tightening the ring 104.

Referring to Figure 5, a structure is shown, for employment in such cases, as where the screw shaft 20 is of the long-lead multiple thread type, and may be similar to either of the previously described structures, except for portions 126, on the mating or adjacent ends of the components 94 and 96, of smaller diameter than the components, constituting positioning means for a shim or shims 128, and providing a space for these shims radially outwardly of the portions 126 between the components.

With a long-lead thread, when the components 94 and 96 are backed away from each other, the axial distance between the components increases more rapidly, in proportion to the screw turning action therebetween, than in the structure above described. In such case, it may not always be possible to obtain the desired clearance by the splines alone, but the number of shims, when they are necessary or desired, is reduced.

In each of the forms of Figures 1 to 4 inclusive, the nut structure is entirely self contained, that is, it requires no parts, such as shims, which are not at all times carried with the nut as part thereof, and in none of the forms does the means, for maintaining the components 94 and 96 together, depend for operation, other than its operation on the screw, upon cooperation with any element separate from the nut.

It is to be understood that the key means 82, the guide slot means 112 and the jaws 84 and 86 are optional, or employable in any combination with the remaining features according to the needs of a particular case.

By the invention, the actuator is improved, and a compound nut of general application provided, which is an improvement over former compound nuts in the fineness of its adjustment and the elimination, and reduction of the number, of shims. Further advantages are provided over one-piece nuts in not requiring the threads to be held to usual close tolerances, whereby facility of manufacture, assembly and adjustment are accomplished in a manner rendering the invention a distinct advance in its field.

Although only three embodiments of the invention have been illustrated and described, various changes in the form and relative arrangements of the parts may be made to suit requirements.

What is claimed is:

1. In an actuator comprising a longitudinally extensible elongated link including axially relatively movable housing and tube portions having outer end terminals, respectively, at opposite ends of the link adapted for linking the actuator between relatively movable members, a screw shaft in said tube, and means in the housing for rotating the shaft, the combination of key means extending along and inside the tube, structure having a lateral shoulder adjacent to the inner end of the tube, a nut on the shaft carried by the tube having a stop at each end and comprising relatively movable axially separable nut components embodying radially outwardly extending adjacent end collars having radially outer axial splines thereabout, respectively, adapted for axial register with each other at any selected of a plurality of positions of said components relative to each other about the screw shaft and one of which collars is adapted to be positioned axially by said shoulder, a ring structure having a radial shoulder cooperating with said first shoulder to axially embrace said collars, one of said structures having internal splines adapted to fit between the splines of said components at any of said positions, means cooperating between said ring and said first structure and clamping said shoulders axially oppositely relative to said collars, at least one of said structures having guide slot means axially slidably fitting said key means and prevented from turning thereby, and stops on the screw shaft cooperating with said nut stops and to stop the nut at the ends of its travel.

2. In an actuator comprising a longitudinally extensible elongated link including axially relatively movable housing and tube portions having outer end terminals, respectively, at opposite ends of the link adapted for linking the actuator between relatively movable members, a screw shaft in said tube, and means in the housing for rotating the shaft, the combination of structure forming a lateral shoulder on the tube, a nut on the shaft carried by the tube adjacent to said structure and comprising relatively movable axially separable nut components embodying radially outer adjacent end collars having radially outer axial splines thereabout, respectively, adapted for axial register with each other at any selected of a plurality of positions of said components relative to each other about the screw shaft and one of which collars is adapted to be positioned axially by said shoulder, a ring structure having a radial shoulder cooperating with said first shoulder to axially embrace said collars, one of said structures having splines adapted to fit between the splines of said components at any of said positions, and means cooperating between said ring and said first structure and clamping said shoulders axially oppositely relative to said collars.

3. In means comprising a screw shaft, the combination of a nut device for the shaft including a structure having a lateral shoulder, relatively movable axially separable nut components embodying radially outer collars having radially outer axial splines thereabout, respectively, adapted for axial register with each other at any selected of a plurality of positions of said components relative to each other about the screw shaft and one of which collars is adapted to be positioned axially by said shoulder, a ring structure having a lateral shoulder cooperating with said first shoulder to axially embrace said collars, one of said structures having internal splines adapted to fit between the splines of said components at any of said positions, and means cooperating between said ring and said first structure and clamping said shoulders axially oppositely relative to said collars.

4. In means comprising a screw shaft, the combination of a nut device for the shaft including a structure having a lateral shoulder, relatively movable axially separable nut components having radially outer axial splines thereabout, respectively, adapted for axial register with each other at any selected of a multiplicity of positions of said components relative to each other about the screw shaft and one of which components is adapted to be positioned axially by said shoulder, a component-connecting ring structure having a lateral shoulder cooperating with said first shoulder to axially embrace said components, one of said structures having internal splines adapted to fit between the splines of said components at any of said positions, and means cooperating between said ring and said first structure and clamping said shoulders axially oppositely relative to said components.

5. In means comprising a tubular screw shaft, the combination of a nut device for the shaft including a structure having a lateral shoulder, relatively movable axially separable nut components having axial splines adapted for axial register with each other at any selected of a multiplicity of positions of said components relative to each other about the screw shaft axis and one of which components is adapted to be positioned axially by said shoulder, a component-connecting, structure having a lateral shoulder cooperating with said first shoulder to axially embrace said components, one of said structures having splines adapted to fit between the splines of said components at any of said positions, and means cooperating between said component-connecting structure and said first structure and clamping said shoulders axially oppositely relative to said components.

6. The combination of a nut including a structure having a shoulder laterally of the nut axis, relatively movable axially separable nut components embodying radially outer adjacent end collars having radially outer axial splines thereabout, respectively, adapted for axial register at any selected of a plurality of positions of said components relative to each other about the nut axis and one of which collars is adapted to be positioned axially by said shoulder, a ring structure provided with a radial shoulder cooperating with said first shoulder to axially embrace said collars, one of said structures having splines adapted to fit between the splines of said components at any of said positions, and means cooperating between said ring and said first structure and clamping said shoulders oppositely relative to said collars.

7. The combination of a nut including a structure having a shoulder and a flange laterally of the nut axis, relatively movable axially separable nut components embodying radially outer adjacent end collars having radially outer axial splines thereabout, respectively, adapted for axial register at any selected of a plurality of positions of said components relative to each other about the nut axis and one of which collars is adapted to be positioned axially by said shoulder, a ring having internal splines adapted to fit between the splines of said components at any of said positions and provided with a radial shoulder cooperating with said first shoulder to axially embrace said collars, and bolt and nut means cooperating between said ring and said flange and clamping said shoulders oppositely relative to said collars.

8. The combination of a nut including a structure having a shoulder laterally of the nut axis and including an exteriorly screw threaded sleeve having axially extending inner splines, relatively movable axially separable nut components embodying radially outer adjacent end collars having radially outer axial splines thereabout, respectively, adapted for position between the splines of said sleeve therein at any selected of a plurality of positions of said components relative to each other about the nut axis and one of which collars is adapted to be positioned axially by said shoulder, and a ring having a radial shoulder cooperating with said first shoulder to axially embrace said collars and provided with inner screw threads cooperating with the threads of said sleeve and clamping said shoulders oppositely relative to said collars.

9. The combination of a nut including a structure having a shoulder laterally of the nut axis, relatively movable axially separable nut components embodying radially outer adjacent end collars having radially outer axial splines thereabout, respectively, adapted for axial register at any selected of a plurality of positions of said components relative to each other about the nut axis and one of which collars is adapted to be positioned axially by said shoulder, said components having adjacent end portions of smaller diameter than the components constituting positioning means for shims and providing space for the shims radially outwardly of said end portions between the components, a ring structure provided with a radial shoulder cooperating with said first shoulder to axially embrace said collars, one of said structures having splines adapted to fit between the splines of said components at any of said positions, and means cooperating between said ring and said first structure and clamping said shoulders oppositely relative to said collars.

10. The combination of a nut adapted for cooperation with a screw shaft and including relatively movable axially separable nut components having axial splines, respectively, about the nut axis adapted for axial register with each other at any selected of a multiplicity of positions of the components relative to each other about said axis, and means for maintaining said components in said selected positions including a member having spline means adapted to fit between splines of said components.

LEONARD OCHTMAN.

REFERENCES CITED

The following references are of record in the file of this patent:

UNITED STATES PATENTS

| Number | Name | Date |
| --- | --- | --- |
| 2,358,954 | Verderber | Sept. 26, 1944 |

FOREIGN PATENTS

| Number | Country | Date |
| --- | --- | --- |
| 15,598 | Great Britain | June 10, 1906 |